US008117609B2

(12) United States Patent
Lantz et al.

(10) Patent No.: US 8,117,609 B2
(45) Date of Patent: Feb. 14, 2012

(54) SYSTEM AND METHOD FOR OPTIMIZING CHANGES OF DATA SETS

(75) Inventors: Staffan Lantz, Stockholm (SE); Lars Jansson, Bromma (SE)

(73) Assignee: OMX Technology AB, Stockholm (SE)

( * ) Notice: Subject to any disclaimer, the term of this patent is extended or adjusted under 35 U.S.C. 154(b) by 1424 days.

(21) Appl. No.: 11/641,957

(22) Filed: Dec. 20, 2006

(65) Prior Publication Data
US 2008/0155527 A1 Jun. 26, 2008

(51) Int. Cl.
*G06F 9/44* (2006.01)
(52) U.S. Cl. ......... 717/168; 717/169; 717/171; 717/172
(58) Field of Classification Search ......................... None
See application file for complete search history.

(56) References Cited

U.S. PATENT DOCUMENTS

| 5,418,965 | A | * | 5/1995 | Mahar | 711/170 |
| 5,473,772 | A | * | 12/1995 | Halliwell et al. | 717/171 |
| 5,899,998 | A | * | 5/1999 | McGauley et al. | 709/201 |
| 6,260,025 | B1 | | 7/2001 | Silverman et al. | |
| 6,847,971 | B1 | * | 1/2005 | Balaraman et al. | 1/1 |
| 6,925,467 | B2 | * | 8/2005 | Gu et al. | 1/1 |
| 2003/0135419 | A1 | | 7/2003 | Haulk et al. | |
| 2003/0229570 | A1 | | 12/2003 | Hughes, Jr. et al. | |
| 2004/0010429 | A1 | * | 1/2004 | Vedula et al. | 705/7 |
| 2004/0010456 | A1 | | 1/2004 | Hoang | |
| 2006/0107260 | A1 | * | 5/2006 | Motta | 717/170 |

FOREIGN PATENT DOCUMENTS
WO 02/091650 11/2002

OTHER PUBLICATIONS

International Search Report issued for International Patent Application No. PCT/EP2007/064005, dated Apr. 22, 2008.
Labio, Wilbert Juan, et al., "Efficient Snapshot Differential Algorithms for Data Warehousing," Proceedings of the 22 VLDB Conference, 1996, pp. 63-74.
Ram, Prabhu et al., "Extracting Delta for Incremental Data Warehouse Maintenance," Proceedings of the 16th International Conference on San Diego, CA USA, Data Engineering 2000, pp. 220-229.

* cited by examiner

*Primary Examiner* — Emerson Puente
*Assistant Examiner* — Jonathan R Labud
(74) *Attorney, Agent, or Firm* — Nixon & Vanderhye P.C.

(57) ABSTRACT

A system and method for generating an update data set to be sent to remote terminals. The update data set comprises operators describing differences between two data sets, so that a remote terminal is able to transform an old data set into a more recent data set. The system comprises a comparator for comparing data elements in the data sets, and a selector for selecting operators based on a change parameter stored in a memory.

19 Claims, 10 Drawing Sheets

Data Set A

| Logical Position | Key | Data part |
|---|---|---|
| 1 | 99 | 10 |
| 2 | 98 | 10 |
| 3 | 97 | 10 |
| 4 | 96 | 10 |
| 5 | 95 | 10 |
| 6 | 94 | 10 |
| 7 | 93 | 10 |
| 8 | 92 | 10 |

Data Set B

| Logical Position | Key | Data part |
|---|---|---|
| 1 | 101 | 10 |
| 2 | 100 | 10 |
| 3 | 97 | 10 |
| 4 | 93 | 15 |
|  |  |  |
|  |  |  |
|  |  |  |
|  |  |  |

FIG 6

Data Set A

| Logical Position | Key | Data part |
|---|---|---|
| 1 | 99 | 10 |

Data Set B

| Logical Position | Key | Data part |
|---|---|---|
| 1 | 101 | 10 |

FIG 7

Data Set A

| Logical Position | Key | Data part |
|---|---|---|
| 1 | 99 | 10 |

Data Set B

| Logical Position | Key | Data part |
|---|---|---|
| 2 | 100 | 10 |

FIG 8

Data Set A

| Logical Position | Key | Data part |
|---|---|---|
| 1 | 99 | 10 |

Data Set B

| Logical Position | Key | Data part |
|---|---|---|
| 3 | 97 | 10 |

FIG 9

Data Set A

| Logical Position | Key | Data part |
|---|---|---|
| 2 | 98 | 10 |

Data Set B

| Logical Position | Key | Data part |
|---|---|---|
| 3 | 97 | 10 |

FIG 10

Data Set A

| Logical Position | Key | Data part |
|---|---|---|
| 3 | 97 | 10 |

Data Set B

| Logical Position | Key | Data part |
|---|---|---|
| 3 | 97 | 10 |

FIG 11

| Operator | Logical Position | Key | Data part |
|---|---|---|---|
| Replace | 1 | 101 | 10 |
| Replace | 2 | 100 | 10 |

FIG 12

Data Set A

| Logical Position | Key | Data part |
|---|---|---|
| 4 | 96 | 10 |

Data Set B

| Logical Position | Key | Data part |
|---|---|---|
| 4 | 93 | 15 |

FIG 13

Data Set A

| Logical Position | Key | Data part |
|---|---|---|
| 5 | 95 | 10 |

Data Set B

| Logical Position | Key | Data part |
|---|---|---|
| 4 | 93 | 15 |

FIG 14

Data Set A

| Logical Position | Key | Data part |
|---|---|---|
| 6 | 94 | 10 |

Data Set B

| Logical Position | Key | Data part |
|---|---|---|
| 4 | 93 | 15 |

FIG 15

Data Set A

| Logical Position | Key | Data part |
|---|---|---|
| 7 | 93 | 10 |

Data Set B

| Logical Position | Key | Data part |
|---|---|---|
| 4 | 93 | 15 |

FIG 16

Data Set A

| Logical Position | Key | Data part |
|---|---|---|
| 8 | 92 | 10 |

Data Set B

| Logical Position | Key | Data part |
|---|---|---|
| 5 | | |

FIG 17

Data Set A

| Logical Position | Key | Data part |
|---|---|---|
| 9 | | |

Data Set B

| Logical Position | Key | Data part |
|---|---|---|
| 5 | | |

FIG 18

| Operator | Logical Position | Key | Data part |
|---|---|---|---|
| Delete (5) | 4 | | |
| Add | 4 | 93 | 15 |

FIG 19

| Operator | Logical Position | Key | Data part |
|---|---|---|---|
| Replace | 1 | 101 | 10 |
| Replace | 2 | 100 | 10 |
| Delete (5) | 4 | | |
| Add | 4 | 93 | 15 |

FIG 20

Data Set A

| Logical Position | Key | Data part |
|---|---|---|
| 1 | 99 | 10 |
| 2 | 98 | 10 |
| 3 | 97 | 10 |
| 4 | 96 | 10 |
| 5 | 95 | 10 |
| 6 | 94 | 10 |
| 7 | 93 | 10 |
| 8 | 92 | 10 |

Data Set B

| Logical Position | Key | Data part |
|---|---|---|
| 1 | 101 | 10 |
| 2 | 100 | 10 |
| 3 | 97 | 10 |
| 4 | 93 | 15 |
|  |  |  |
|  |  |  |
|  |  |  |
|  |  |  |

FIG 21

| Operator | Logical Position | Key | Data part |
|---|---|---|---|
| Replace | 1 | 101 | 10 |

FIG 22

Data Set A

| Logical Position | Key | Data part |
|---|---|---|
| 1 | ~~99~~ | ~~10~~ |
|  | 101 | 10 |
| 2 | 98 | 10 |
| 3 | 97 | 10 |
| 4 | 96 | 10 |
| 5 | 95 | 10 |
| 6 | 94 | 10 |
| 7 | 93 | 10 |
| 8 | 92 | 10 |

FIG 23

| Operator | Logical Position | Key | Data part |
|---|---|---|---|
| Replace | 2 | 100 | 10 |

FIG 24

Data Set A

| Logical Position | Key | Data part |
|---|---|---|
| 1 | ~~99~~ | ~~10~~ |
|   | 101 | 10 |
| 2 | ~~98~~ | ~~10~~ |
|   | 100 | 10 |
| 3 | 97 | 10 |
| 4 | 96 | 10 |
| 5 | 95 | 10 |
| 6 | 94 | 10 |
| 7 | 93 | 10 |
| 8 | 92 | 10 |

FIG 25

| Operator | Logical Position | Key | Data part |
|---|---|---|---|
| Delete (5) | 4 | | |

FIG 26

Data Set A

| Logical Position | Key | Data part |
|---|---|---|
| 1 | ~~99~~ | ~~10~~ |
|   | 101 | 10 |
| 2 | ~~98~~ | ~~10~~ |
|   | 100 | 10 |
| 3 | 97 | 10 |
| 4 | ~~96~~ | ~~10~~ |
|   |   |   |
| 5 | ~~95~~ | ~~10~~ |
|   |   |   |
| 6 | ~~94~~ | ~~10~~ |
|   |   |   |
| 7 | ~~93~~ | ~~10~~ |
|   |   |   |
| 8 | ~~92~~ | ~~10~~ |
|   |   |   |

FIG 27

| Operator | Logical Position | Key | Data part |
|---|---|---|---|
| Add | 4 | 93 | 15 |

FIG 28

Data Set A

| Logical Position | Key | Data part |
|---|---|---|
| 1 | ~~99~~ | ~~10~~ |
|   | 101 | 10 |
| 2 | ~~98~~ | ~~10~~ |
|   | 100 | 10 |
| 3 | 97 | 10 |
| 4 | ~~96~~ | ~~10~~ |
|   | 93 | 15 |
| 5 | ~~95~~ | ~~10~~ |
|   |   |   |
| 6 | ~~94~~ | ~~10~~ |
|   |   |   |
| 7 | ~~93~~ | ~~10~~ |
|   |   |   |
| 8 | ~~92~~ | ~~10~~ |
|   |   |   |

FIG 29

Data Set B

| Logical Position | Key | Data part |
|---|---|---|
| 1 | 101 | 10 |
| 2 | 100 | 10 |
| 3 | 97 | 10 |
| 4 | 93 | 15 |

SYSTEM AND METHOD FOR OPTIMIZING CHANGES OF DATA SETS

TECHNICAL FIELD

The technology described in this application relates to data dissemination in computer environments, and especially relates to extraction of changes in data sets for distribution of the changes in computer networks.

BACKGROUND

Today it is very common that data is sent over computer networks. The amount of data being sent is rapidly increasing due to the advances in technology, making it possible to send and process more data at higher speed. Furthermore, new applications also demand more data since they have become more complex. An example of computer systems where data dissemination technologies is important is an electronic trading systems.

Electronic trading of securities, derivatives, commodities and other financial instruments results in large amount of data which has to be distributed to users that the data for making trade decisions, statistical calculations and other assessments. The process of extracting and sending all this information in a high performance computer system can be very demanding for a processor. The amount of CPU time is a sparse resource that should not be wasted on executing steps that could be avoided.

Furthermore the users connected to such a centralised trading system typically want to have the information as soon as possible. In these cases it may not only be enough to boost the performance in the central system by for example updating the hardware.

In order to get rid of a bottleneck or other latency problem in the system, additional techniques may have to be used.

Thus, one such additional technique is to make the work of the processor more efficient. For example when updating a data set on a user terminal there exist different approaches.

One commonly used solution is to always send the complete new data set, which replaces the old data set. This is often inefficient when only part of the data in the sets has been changed. Thus a more efficient approach may be to only send the parts of the data set that have changed. An even further enhancement may be to send the delta changes.

Another known technology is to send operators that describe the differences between two data sets. Applying the operators on the first data set converts it into the second data set.

With the selection of a good set of operators acting on the data set, optimisation is possible. There are today poor methods available for extracting data set differences.

Hence, there is a need for developing techniques for extracting and selecting operators in an efficient way, for example with a fewer number of steps, in order to reduce the load on a processor and to reduce data dissemination such as bandwidth in a computer system.

SUMMARY

Thus it is an object to generate an update data set to be sent to remote terminals.

It is another object to efficiently extract data from a data set.

It is another object to efficiently extract and/or selects operators based on differences between data sets.

It is another object to generates a data structure to be sent to remote terminals.

It is another object to use less processor time.

According to a first aspect the above and other objects are achieved by a computer system for generating an update data set to be sent to remote terminals, the update data set comprising operators describing differences between a first data set comprising sorted data elements and a second data set comprising sorted data elements, the computer system comprising:

a memory comprising the first and the second data set, a comparator connectable to the memory for sequentially comparing the data elements in the second data set with the data elements in the first data set, the result of a first comparison controls which data element in the first data set and which data element in the second data set that will be compared in a second comparison, updating a change parameter in the memory after each comparison, and initiating a selector upon detection of a data element in the second data set being identical to a data element in the first data set, the selector being connectable to the memory and to the comparator, the selector being adapted to determine operators based on the change parameter stored in the memory, and storing the determined operators in the memory, thereby generating an update data set comprising operators describing the differences between the second data set and the first data set, to be sent to the remote terminals.

The computer system has the advantage that it makes it possible for a computer system such as a trading system to more efficiently generate an update data set by using less CPU time. For example, since the computer system makes it possible to compare the first and second data set preferably by only one run through of each data set.

The computer system further comprising a communicator associated with the selector for generating and sending an update message comprising the update data set. The message may comprise a data structure such as a list, an array, bitboard, stack, heap, tree or collection and so forth comprising the data set to be sent to remote terminals. Preferably the message is sent by using the FIX standards, however any other protocol well known to the person skilled in the art may be used to send the message such as Omnet API, XTP, SSL or any other standard or proprietary protocols.

Preferably the first and second data set comprises dynamic data elements changing over time. For example the first data set may be an orderbook in a trading system at the time T1, the second data set may be the orderbook at the time T2. The data in the orderbook may have changed during the time T1 and T2, since new orders may have been entered, either buying or offering for sale financial instruments. Information dissemination systems may disseminate information to remote terminals either at certain predetermined time intervals or upon an activity in the orderbook. For example if the orderbook doesn't receive any new order there is no meaning to send new updates to the remote terminal. However when a new order enters the orderbook the new information has to be propagated to the remote terminals. Thus, at this point in time when an activity occurred it may be necessary to send update messages. Another example where changes may occur in the orderbooks is during state transition, for example when an orderbook opens or closes.

Hence the second data set is a later version of the first data set. In this way the central system can compare what changes that have occurred, and since the central system knows what data set the remote terminals have, the central systems can extract the operators to store and send in the update data set. Furthermore it may also be possible to send certain parts of the changes between the first and the second data set to specific remote terminals, since the users on the remote terminals may want to have information relating to different parts of the data sets.

Preferably the operators is determined from a group comprising the following operators: Add operator, Delete operator, Replace operator. By determining these operators based on the change parameter it is possible to generate the update data set. The operators may be combined as described later in this document.

The change parameter preferably comprise a first counter related to the first data set and a second counter related to the second data set. In this way the selection process can be monitored and managed in a more accurate way. Thus, the selector may determine operators based on the relation between the first counter related to the first data set and the second counter related to the second data set. This speeds up the process of selection since the relation is preferably a relation chosen from a group of relations, the group comprising: >, <, =, ≧, ≦ or ≠. Based on the relation between the counters at least one of the operators: Add, Delete, Replace, is determined.

The change parameter may further comprise a first position parameter associated with the first data set and a second position parameter associated with the second data set for keeping track of the logical position of the comparator in the first and second data set. In this way the result of the sequential comparison of the first and second list can be monitored and managed in a more accurate way.

The operators may comprise delta changes. Thus if only a part of a data element has changed the operator may describe the part of the data element that has changed. However the operator could also describe that the whole data element should be e.g. deleted or replaced or added.

Each data element normally comprises at least a key. However the data element may also comprise a data part. Generally the Data part may be empty. However in a trading system a typical key is a price in an order book. The data part could for example be the aggregated volume for that price. However it is not always necessary to send the whole key if the key comprises price and time. Sorting of the elements may be based on price and time but only the price may be sent to a remote terminal.

In a second aspect the above and other objects are achieved by an electronic trading system comprising the computer system as mentioned above.

The computer system may thus be an integrated module in an electronic trading system. It can also be a stand alone module that can be sold separately as an information extraction system.

In a third aspect, the above and other objects are fulfilled by a method for generating an update data set to be sent to remote terminals, the update data set comprising operators describing differences between a first data set comprising sorted data elements and a second data set comprising sorted data elements, the method comprising the steps of:
  sequentially comparing the data elements in the first data set with the data elements in the second data set, the result of a first comparison controls which data element in the first data set and which data element in the second data set that will be compared in a second comparison,
  after each comparison a change parameter is updated in the memory,
  upon detection of a data element in the second data set being identical to a data element in the first data set, initiating a selection process determining operators based on the change parameter stored in the memory,
  storing the determined operators in the memory, thereby generating an update data set comprising operators describing the differences between the first data set and the second data set, to be sent to remote terminals.

The method has the advantage that it makes it possible for a computer system such a trading system to more efficiently generating an update data set by using less CPU time since the technology described in this application makes it possible to compare the first and second data set preferably by only one run through of each data set.

The method may further comprise the step of associating the determined operators to compared data elements. In this way the system is able to keep track of which data element that the operator should be used on.

The method may also comprise the step of: determining at least one operator from a group comprising the following operators: Add operator, Delete operator, Replace operator. By determining these operators based on the change parameter it is possible to generate the update data set. The operators may be combined as described later in this document.

As mentioned above the change parameter may comprise a first counter related to the first data set and a second counter related to the second data set. Hence the method may further comprise the step of determining operators based on a relation between the first counter related to the first data set and the second counter related to the second data set.

Preferably each data element comprises a key and a data part, the method may further comprising the step of comparing at least one of the key and data part of an element of the first data set with at least one of the key and data part of an element of the second data set.

As mentioned earlier the first and second data set may comprise dynamical information changing over time.

In a fourth aspect, the above and other objects are fulfilled by a computer program product according to any of the previous described aspects and/or embodiments, the computer program product being stored on a data carrier.

These and other aspects will be apparent from and elucidated with reference to the non-limiting, example embodiments described hereinafter.

DETAILED DESCRIPTION

Figure 1:
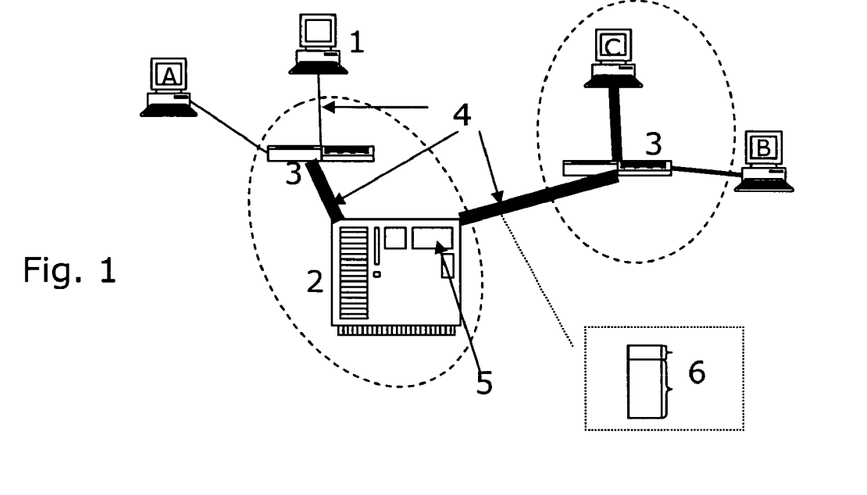
FIG. 1 illustrates an overview of a computer network.

FIG. 1 illustrates a computer network comprising remote terminals 1, a central computer 2 and gateways or routers 3. Between the different devices there are connections illustrated by lines 4 having different thickness. The thickness illustrates the bandwidth (data rate). A thick line has a high data rate and a thin line has low data rate. Three of the front end computers in FIG. 1 have a letter on the screen, this illustrates that it is a remote terminal belonging to user A, B and C. Update data sets 6 is sent from the central computer 2 to the remote terminals 1 over the network comprising lines 4 and network devices such as the routers and so forth. The update data sets 6 are generated in the computer system 5.

Figure 2:
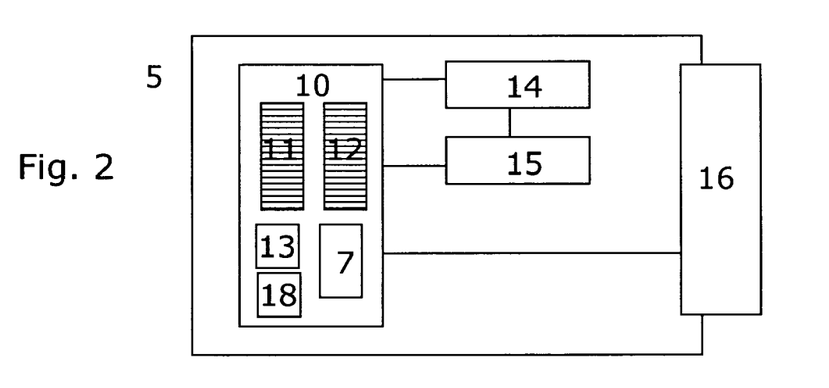
FIG. 2 illustrates an electronic device comprising a memory, a first data set, a second data set, a change parameter, a comparator, a selector, an update data set and an interface.

FIG. 2 illustrates the computer system 5. The computer system 5, comprising a memory 10, a comparator 14, a selector 15, and an interface 16 for sending the update data sets 7. The memory 10 comprises a first data set 11 and a second data set 12. Furthermore the memory comprises an area for storing a change parameter 13, an area for storing an update data set 7, and an area for storing the operators 18.

Figure 3:
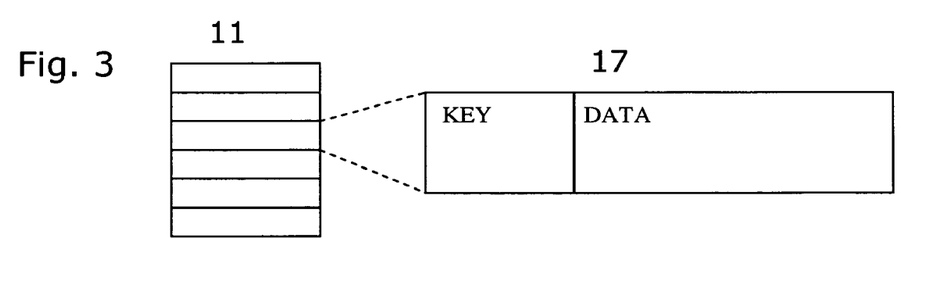
FIG. 3 illustrates a data set comprising data elements, and a data element comprising a key and data.
Figure 4:
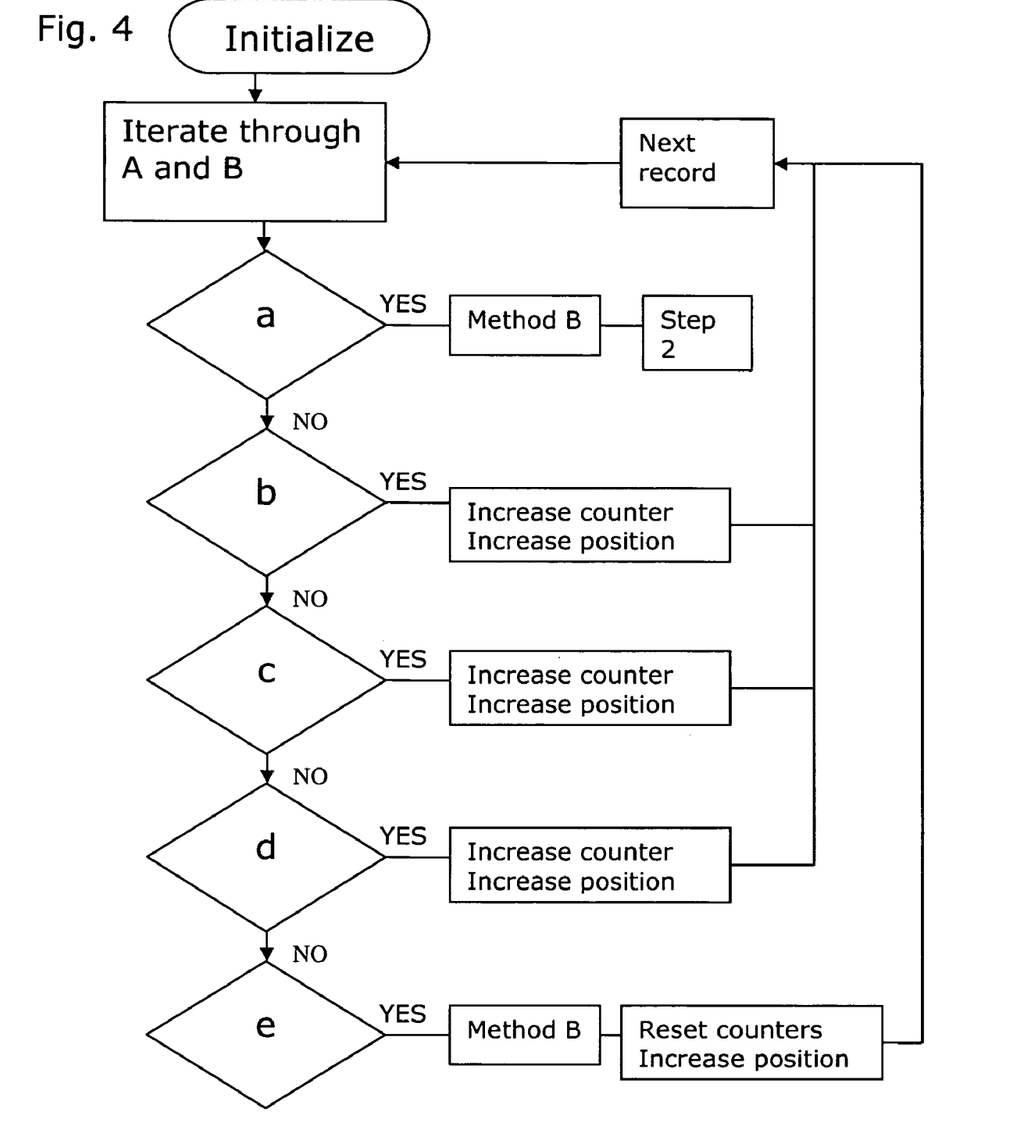
FIG. 4 illustrates the algorithm for iterating through the data sets described in the text.

FIG. 3 illustrates a data set 11 and an enlargement of a data element 17 in the data set. In the figure the data element 17 comprises both a key and a data part. However in another example embodiment the data element 17 may at least comprise the key part.

In the following, the details of how the operators may be determined/selected will be explained.

Below follows an example of a method for selecting operators that efficiently describes the difference between two data sets.

The data sets consist of one or several elements where each element has a key and a possible data part. The key together with a sorting algorithm gives each element a logic position within the data set.

This method is based on:
(1) The design of an efficient set of operators.
(2) The design of an efficient algorithm to evaluate the differences of two data sets, and describe the differences using the set of operators. The algorithm uses a one-pass traversing of the two data sets in order to achieve this.

The method uses the following set of operators to describe changes between two data sets:

| Operator | Meaning |
| --- | --- |
| Add | Add a new element at a given logic position. |
| Delete (N) | Delete one or several (N) elements starting at a given logic position. |
| Replace | Replace the data element at a given logic position. |

Method Introduction

An element that is identical (both key and data part) in the two data sets is unchanged. The algorithm considers an unchanged element as a barrier. The barriers are used by the method to identify when an optimisation of the operator can be performed. The method is based on the observation that optimisations may be possible for the operators used before a barrier is detected.

Figure 5:
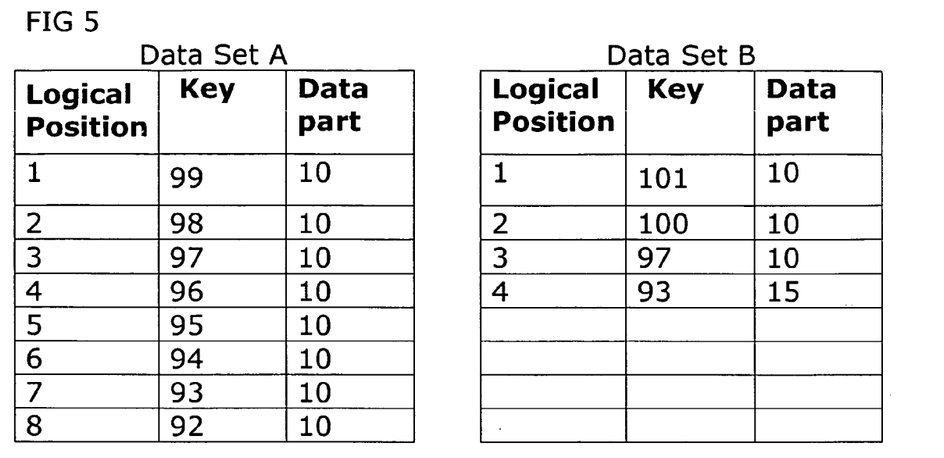
FIG. 5 illustrates the data set A and the data set B.

Assume the data sets A and B shown in FIG. 5. From the data set A, a number of operators can be applied to achieve the data set B. The algorithm and method described below extracts these operators that transform data set A into data set B.

During the traversing of the data sets preferably the following counters are used, #Del and #Add. These are initially set to zero or any other corresponding value that fulfils the same object.

Thereafter the data set A and the data set B are traversed preferably from the beginning, according to the sorting order of keys.

The actual logical position within data set A is hereafter named APos, which comprises the position parameter for data set A. The actual logical position within data set B is hereafter named BPos, which comprises the position parameter for data set B. APos and BPos are initially set to the first logical position within the data sets A and B.

Initialize:
  Set #Add=0 and #Del=0.
  Set APos and BPos to the first logical position within the data sets A and B.
  Set APosStart=APos and BPosStart=BPos.

The algorithm: Iterate through dataset A and B, and Count #Add and #Del:

1. Compare the element from set A with the element from set B at logical position APos and BPos.
   a. If there is no A element and no B element, Select the operators using method B below, then continue with step 2 (Done).
   b. If the keys are identical but the data part is different increase #Add with 1, increase #Del with 1, increase APos with 1 and increase BPos with 1. Continue with step 1 and compare next element.
   c. If the A element key is worse (according to the sorting order) than the B element key, or there is no A element, then increase #Add with 1 and increase BPos with 1. Continue with step 1 and compare next element.

d. If the A element key is better (according to the sorting order) than the B element key, or there is no B element, then increase #Del with 1 and increase APos with 1. Continue with step 1 and compare next element.

e. If both the keys and the data parts are identical a barrier has been found. If (#Add≠0 or #Del≠0) then select the operators using method B below. Continue and:

Set #Add=0 and #Del=0.
Increase APos with 1 and increase BPos with 1.
Set APosStart=APos and BPosStart=BPos.
Continue with step 1 and compare next element.

2. Done.

Method B. Select the operators: Compare #Del with #Add.

a. If #Del>#Add then select the following operators:
Delete (N=#Del) operator at logical Position APosStart.
Followed by:
Add number of Add operators from the set B elements, starting from logical Position APosStart.

b. If the #Del=#Add then select the following operators:
Add number of Replace operators from the set B elements, starting from logical Position APosStart.

c. If #Del<#Add then select the following operators:
Del number of Replace operators from the set B elements, starting from logical position APosStart.
Followed by:
(#Add−#Del) number of Add operators from the set B elements, starting from APosStart+#Del.

EXAMPLE

Below follows a non-limiting example describing the different method steps with reference to the figures.

Imagine two data sets A and B, according to the tables shown in FIG. 5. The elements are preferably sorted based on the key, resulting in the highest value at the logical position 1. Data set A represents the old data set and data set B represents the new data set. The task is to transform data set A into data set B.

Execution of the Method

Initialize:
Set #Add=0 and #Del=0.
Set APos and BPos to the first logical position within the data sets A and B,
giving APos=1 and BPos=1.
Set APosStart=APos and BPosStart=BPos,
giving APosStart=1 and BPosStart=1.

The method and system starts to initialize counters that preferably will be used through the iteration of the data sets.

Thereafter an iteration phase is started wherein the change parameters #Add and #Del is iterated and increased.

STEP 1. Compare the element from set A with the element from set B. Since APos and BPos are both set to 1, this means that the first elements in the list are compared. However if the elements in the data sets are sorted in another way the method may start to compare other elements first.

Figure 6:
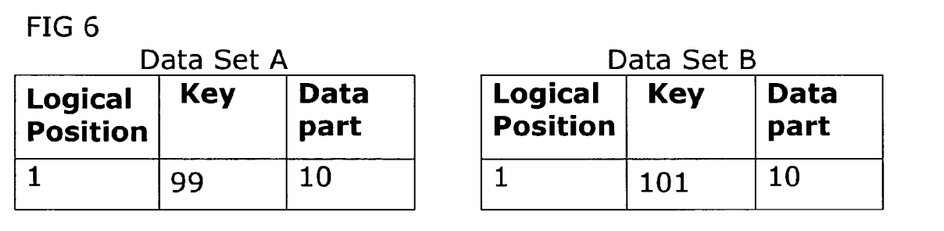
FIG. 6 illustrates a comparison of elements in data set A with elements in data set B.

The comparison is shown in FIG. 6. In this case 99 is worse than 101 (see algorithm step c) (the element (APos=1) in data set A is worse than the element (BPos=1) in data set B), thus increase #Add with 1, giving #Add=1. Increase BPos with 1, giving BPos=2.

Continue with step 1 in the algorithm and compare next element.

STEP 2. Compare the element from set A with the element from set B. Now the BPos counter has increased with 1 therefore the element at (APos=1) in data set A is compared with the element at (BPos=2) in data set B.

Figure 7:
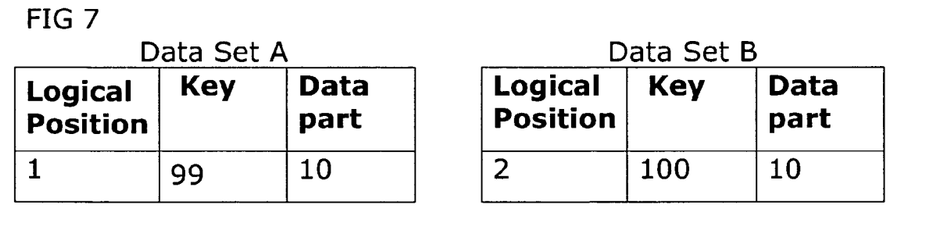
FIG. 7 illustrates a comparison of elements in data set A with elements in data set B.

The comparison is illustrated in FIG. 7. 99 is worse than 100 (see algorithm step c), thus increase #Add with 1, giving #Add=2. Increase BPos with 1, giving BPos=3.

Continue with step 1 in the algorithm and compare next element.

STEP 3. Compare the element from set A with the element from set B. Similar to above.

Figure 8:
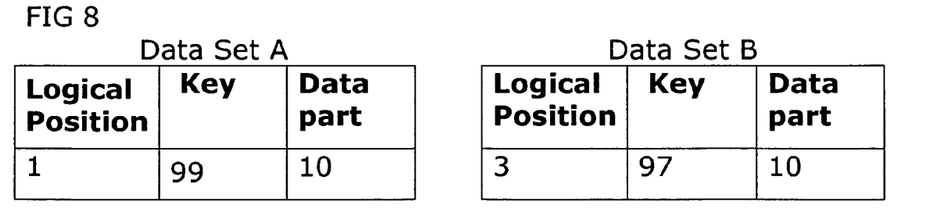
FIG. 8 illustrates a comparison of elements in data set A with elements in data set B.

The comparison is illustrated in FIG. 8. 99 is better than 97 (see algorithm step d), thus increase #Del with 1, giving #Del=1. Increase APos with 1, giving APos=2.

Continue with step 1 in the algorithm and compare next element.

Figure 9:
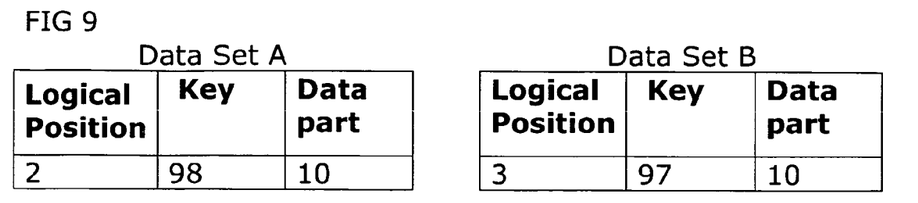
FIG. 9 illustrates a comparison of elements in data set A with elements in data set B.

STEP 4. Compare the element from set A with the element from set B. The comparison is illustrated in FIG. 9. 98 is better than 97 (see algorithm step d), thus increase #Del with 1, giving #Del=2. Increase APos with 1, giving APos=3.

Continue with step 1 in the algorithm and compare next element.

Figure 10:
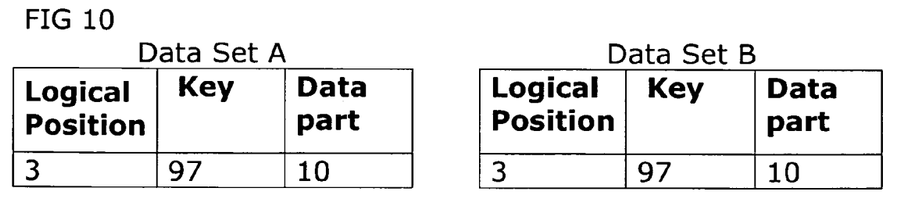
FIG. 10 illustrates a comparison of elements in data set A with elements in data set B.

STEP 5. Compare the element from set A with the element from set B. The comparison is illustrated in FIG. 10. Both the keys and the data parts are identical (see algorithm step e), thus a barrier has been reached.

Initiate the selector and select the operators using method B.

STEP 6. Compare #Del with #Add. According to method B, step b is applicable in this situation:

(b). #Del (2)=#Add (2) and therefore select the following operators:

Replace 2 (#Add) operator, selecting data from set B, starting from logical position APosStart=1.

Figure 11:
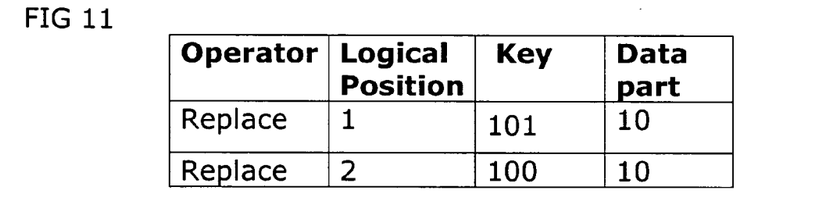
FIG. 11 illustrates the first operators selected by the selection method.

The selected operators are shown in FIG. 11.

STEP 7. The iteration and comparison of the elements in data set A and data set B continues Set #Add=0 and #Del=0.

In order to get by the barrier the counters are increased, APos with 1 and BPos with 1, giving APos=4 and BPos=4.

Set APosStart=APos and BPosStart=BPos, giving APosStart=4 and BPosStart=4.

Continue with step 1 in the algorithm and compare next elements.

Figure 12:
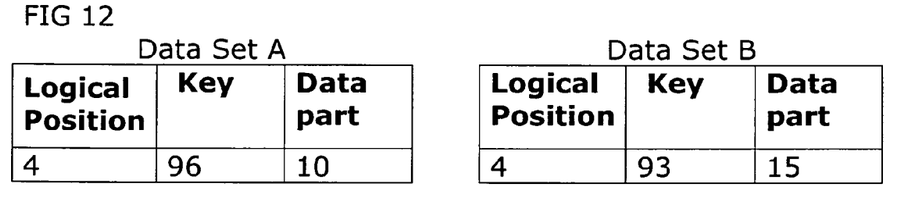
FIG. 12 illustrates a comparison of elements in data set A with elements in data set B.

STEP 8. Compare the element from set A with the element from set B. The comparison is illustrated in FIG. 12. 96 is better than 93 (see algorithm step d), thus increase #Del with 1, giving #Del=1. Increase APos with 1, giving APos=5.

Continue with step 1 in the algorithm and compare next element.

Figure 13:
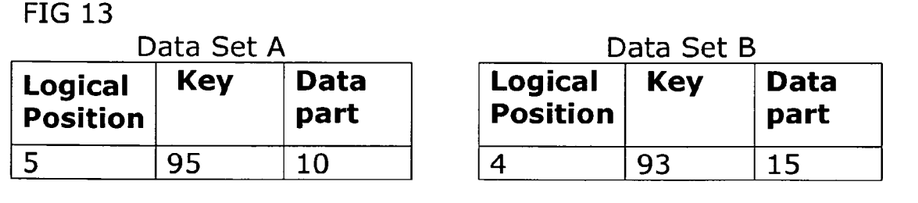
FIG. 13 illustrates a comparison of elements in data set A with elements in data set B.

STEP 9. Compare the element from set A with the element from set B. The comparison is illustrated in FIG. 13. 95 is better than 93 (see algorithm step d), thus increase #Del with 1, giving #Del=2. Increase APos with 1, giving APos=6.

Continue with step 1 in the algorithm and compare next element.

Figure 14:
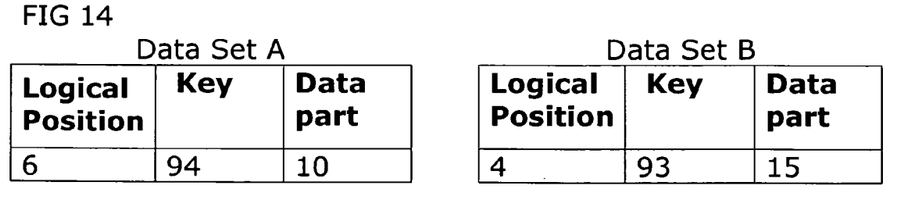
FIG. 14 illustrates a comparison of elements in data set A with elements in data set B.

STEP 10. Compare the element from set A with the element from set B. The comparison is illustrated in FIG. 14. 94 is better than 93 (see algorithm step d), thus increase #Del with 1, giving #Del=3. Increase APos with 1, giving APos=7.

Continue with step 1 in the algorithm and compare next element.

Figure 15:
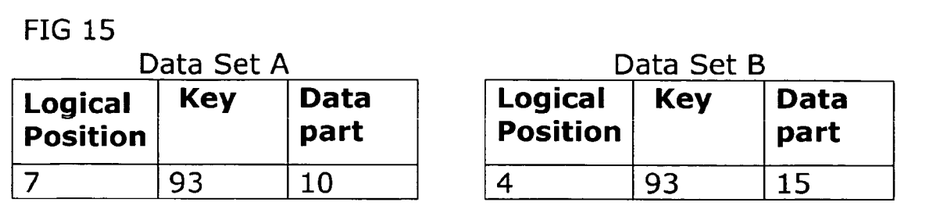
FIG. 15 illustrates a comparison of elements in data set A with elements in data set B.

STEP 11. Compare the element from set A with the element from set B. The comparison is illustrated in FIG. 15. The keys are identical but the data part is different (10 is not equal to 15) (see algorithm step b).

Increase #Add with 1, giving #Add=1.
Increase #Del with 1, giving #Del=4.
Increase APos with 1, giving Apos=8.
Increase BPos with 1, giving Bpos=5.
Continue with step 1 in the algorithm and compare next element.

Figure 16:
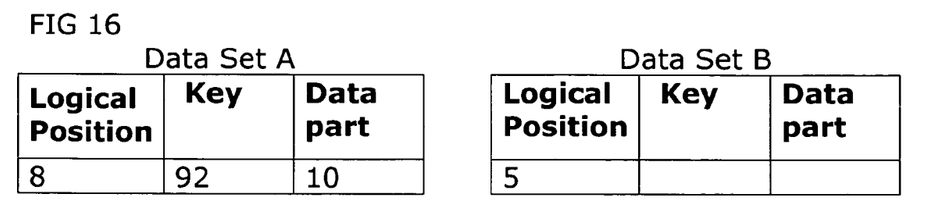
FIG. 16 illustrates a comparison of elements in data set A with elements in data set B.

STEP 12. Compare the element from set A with the element from set B. The comparison is illustrated in FIG. 16. There is no B element (is empty) (see algorithm step d).

Increase #Del with 1, giving #Del=5. Increase APos with 1, giving Apos=9.

Continue with step 1 in the algorithm and compare next element.

Figure 17:
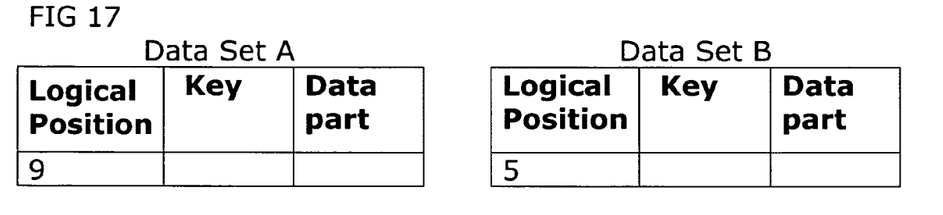
FIG. 17 illustrates a comparison of elements in data set A with elements in data set B.

STEP 13. Compare the element from set A with the element from set B. The comparison is illustrated in FIG. 17. The elements in the data set A at Apos(9), and the data set B and Bpos(5) are empty therefore step a in the algorithm applies. Step a in the algorithm initiates the selector, hence method B as described in step 14.

After the selection continue with step 2 (Done).

STEP 14. Compare the counter #Del with the counter #Add, by use of selection method B.

According to the selection step (a) in selection method B, #Del (5)>#Add (1) and therefore the operators are preferably selected as follows:

Delete 5 (#Del) operator at logical Position AposStart (4).
Followed by:
Add 1 (#Add) operator from the set B elements, starting from logical Position AposStart (4).

Figure 18:
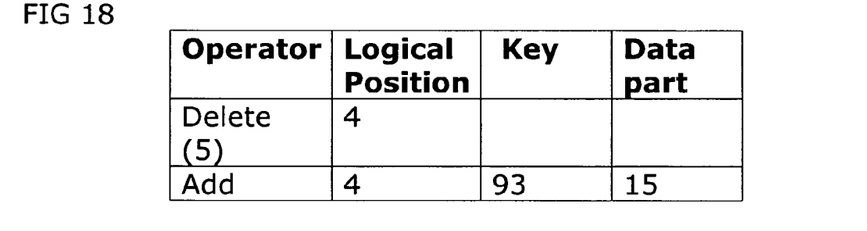
FIG. 18 illustrates additional operators selected by the selection method.

The operators selected are shown in FIG. 18.

STEP 15. The final step 2 (Done) in the algorithm, is reached as mentioned above in step 14.

After the complete iteration of the algorithm and method B the complete number of operators that describe the changes from dataset A to dataset B are stored in the memory, preferably together with the corresponding logical position, key and data part. An update data set is generated comprising the operators, logical positions, keys and data parts, as illustrated in FIG. 19.

In another embodiment the logical position could be represented by the key. In this case the terminal receiving the update data set preferably comprises information of how logical positions relate to each other, so as to be able to sort the data elements. Thus it is not necessary for a logical position to be 1, 2, 3 . . . etc. It can also be represented by A, B, C and so forth, as long as the positions have a relation to each other so as to facilitate sorting.

Figure 19:
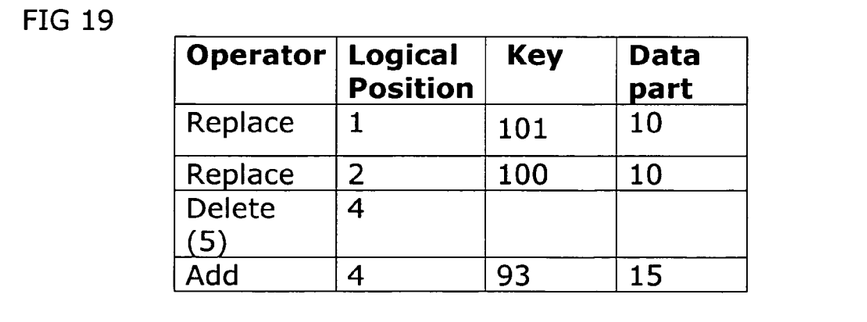
FIG. 19 illustrates an update data set comprising the operators selected by the selection method.

With knowledge of dataset A, and the update data set comprising the operators as illustrated in FIG. 19, the dataset B can be created, by sequentially using the operators one at a time, from beginning to end.

Below follows a stepwise description of how this may be done, illustrated with the accompanying FIGS. 20-29.

Figure 20:
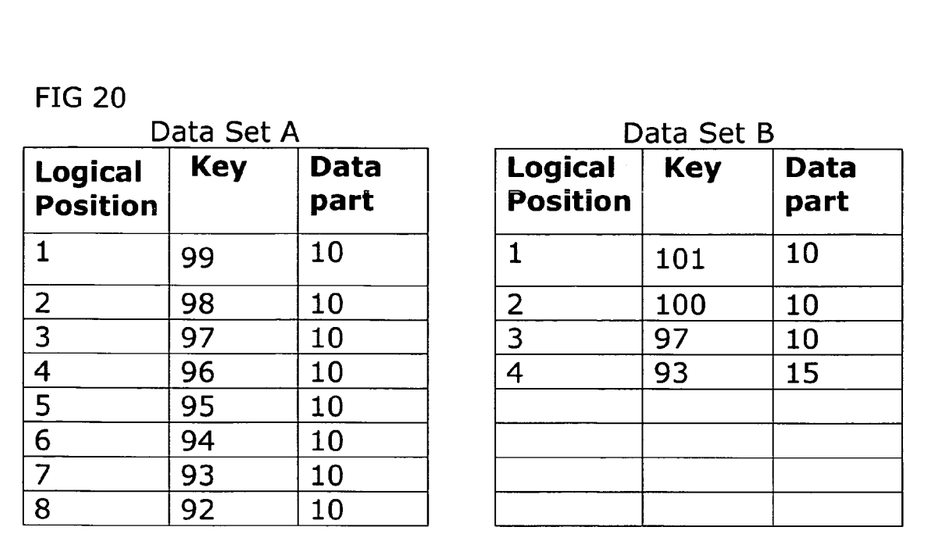
FIG. 20 illustrates the data set A and the data set B before the operators has been used.

FIG. 20, illustrates the situation of data set A and data set B before the update data set has been applied to the data set A. Thus, the following steps creates Data Set B from Data Set A by use of the update data set in FIG. 19.

Figure 21:
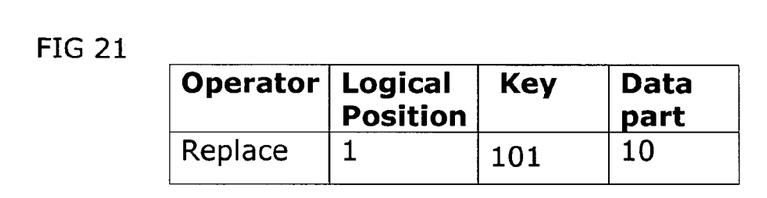
FIG. 21 illustrates a row in the update data set.
Figure 22:
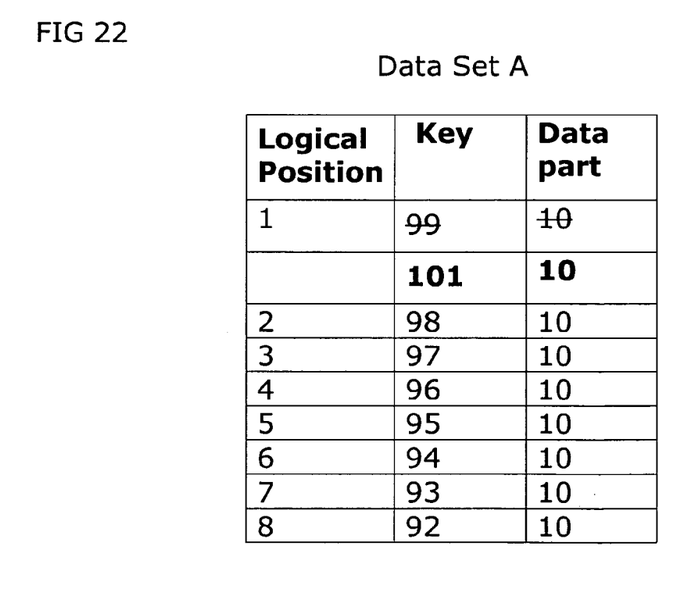
FIG. 22 illustrates the change of data set A after applying the first operator.

By applying the first row, shown in FIG. 21, of the update data set in FIG. 19 to the data set A, an amended data set A as shown in FIG. 22 is obtained.

Figure 23:
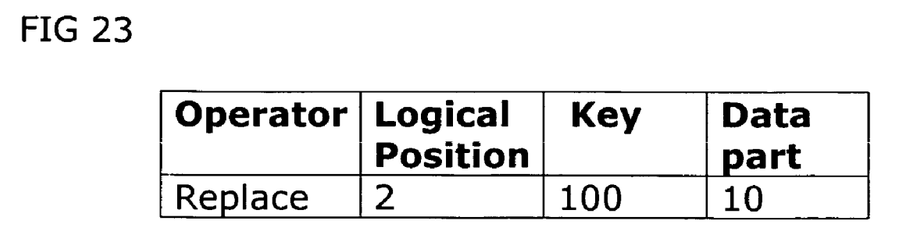
FIG. 23 illustrates a row in the update data set.
Figure 24:
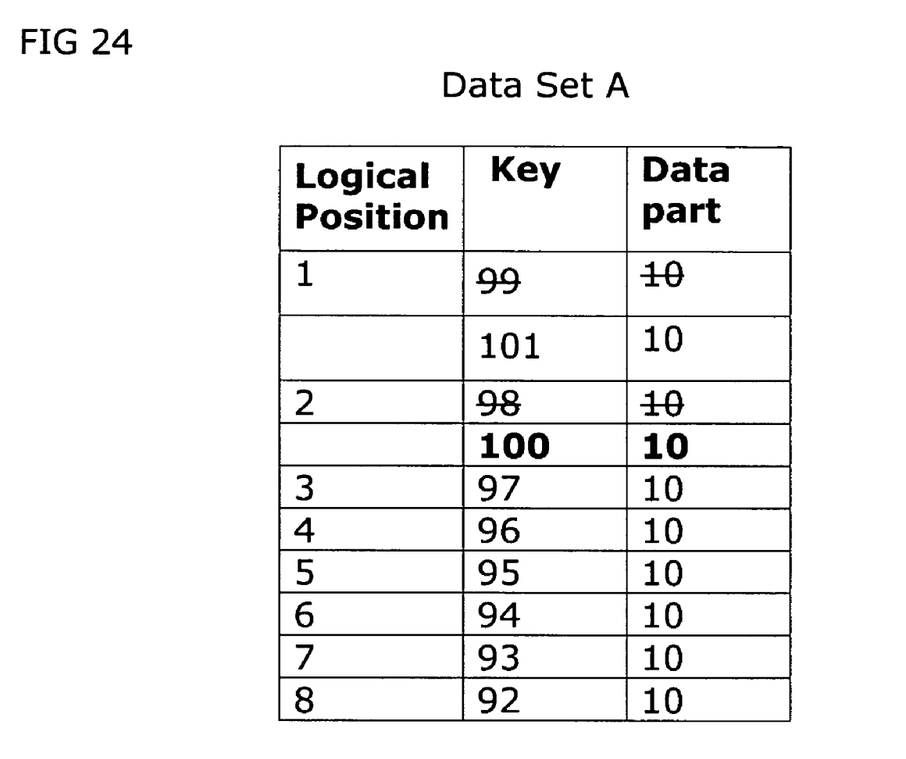
FIG. 24 illustrates the change of data set A after applying the second operator.

By applying the second row, shown in FIG. 23, of the update data set in FIG. 19 to the data set A, an amended data set A as shown in FIG. 24 is obtained.

Figure 25:
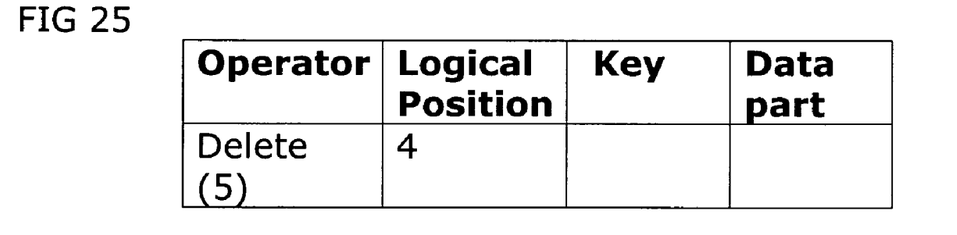
FIG. 25 illustrates a row in the update data set.
Figure 26:
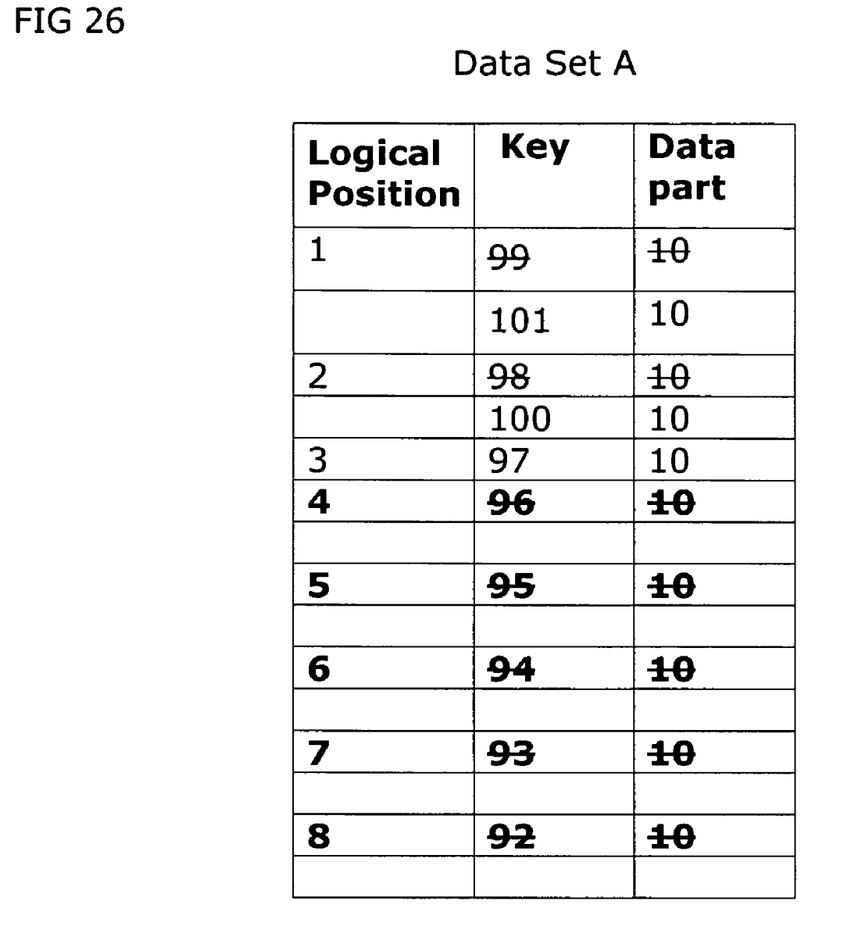
FIG. 26 illustrates the change of data set A after applying the third operator.

By applying the third row, shown in FIG. 25, of the update data set in FIG. 19 to the data set A, an amended data set A as shown in FIG. 26 is obtained.

Figure 27:
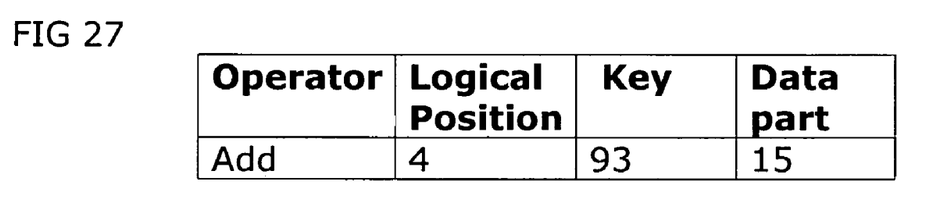
FIG. 27 illustrates a row in the update data set.
Figure 28:
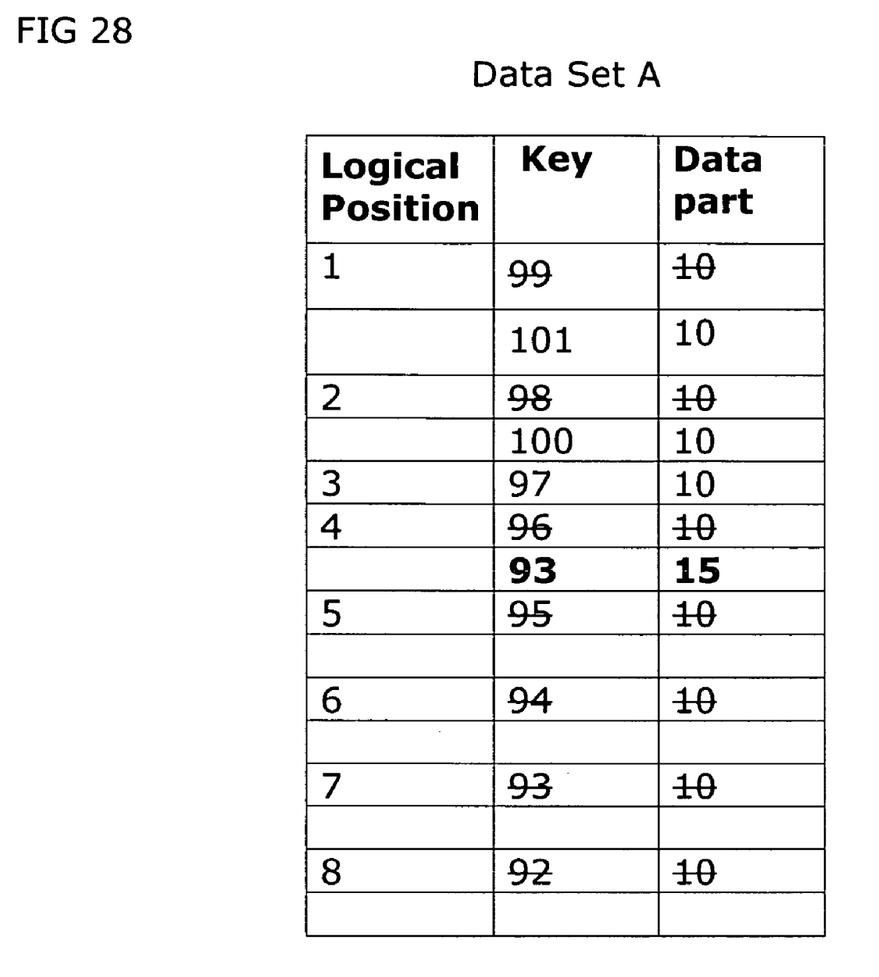
FIG. 28 illustrates the change of data set A after applying the fourth operator.

By applying the third row, shown in FIG. 27, of the update data set in FIG. 19 to the data set A, an amended data set A as shown in FIG. 28 is obtained.

Figure 29:
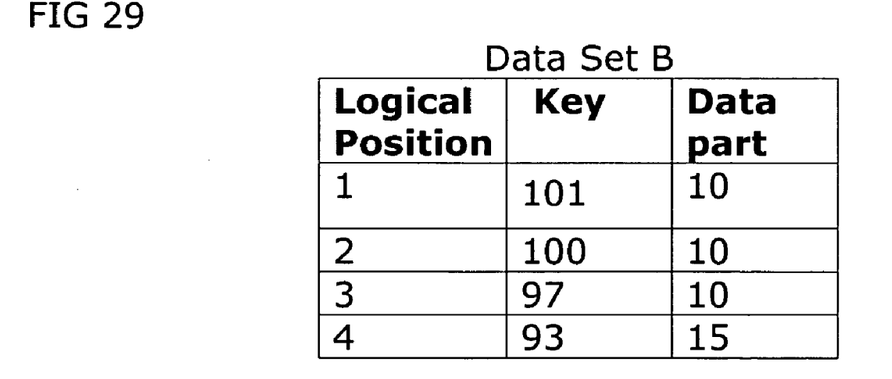
FIG. 29 illustrates the result after the operators have been applied to data set A.
Figure 30:
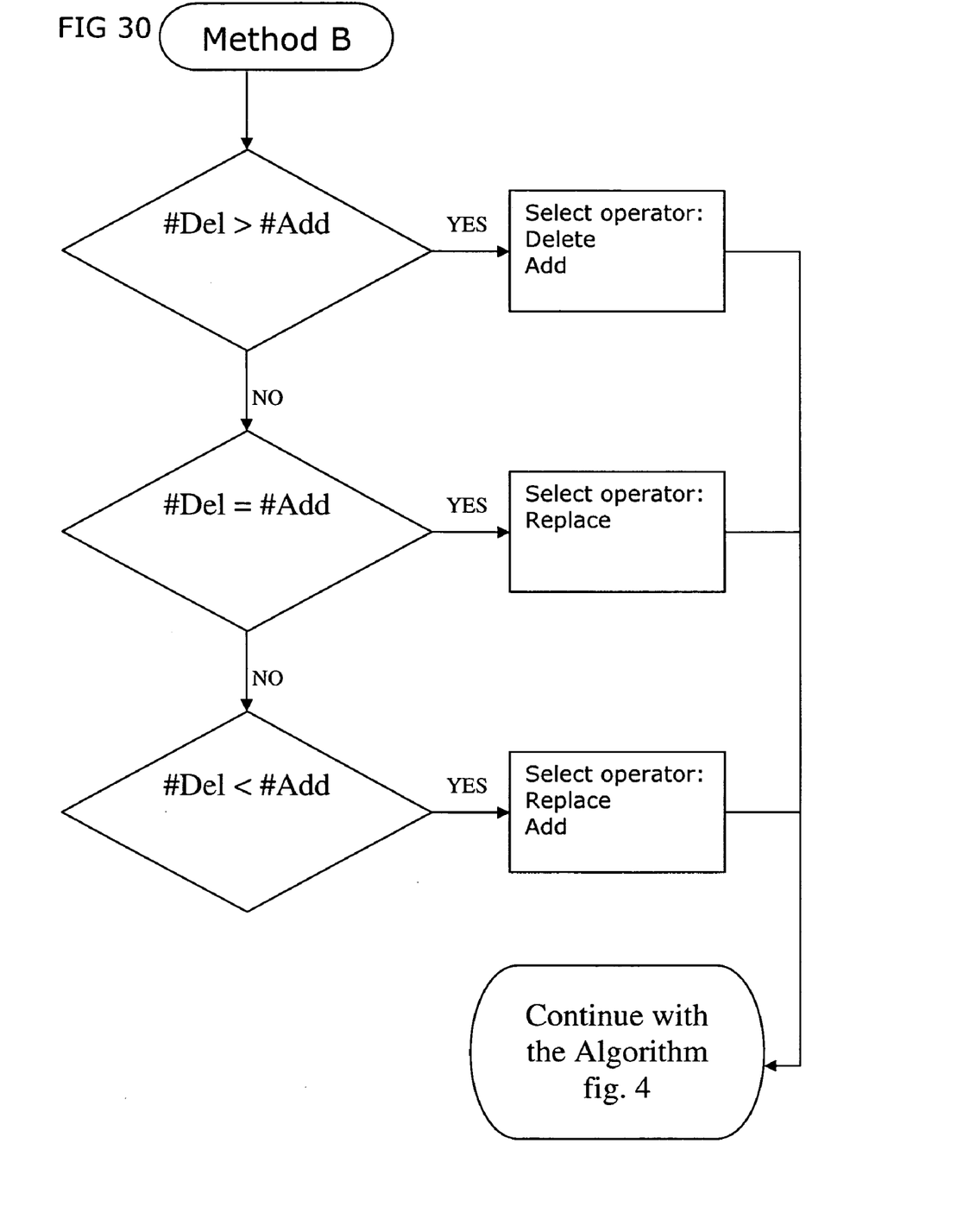
FIG. 30 illustrates the selection method B.

The operators have now transformed the Data Set A into Data Set B as illustrated in FIG. 29.

In the above description the term "comprising" does not exclude other elements or steps and "a" or "an" does not exclude a plurality.

Furthermore the terms "include" and "contain" does not exclude other elements or steps.

The invention claimed is:

1. A computer system for generating an update data set to be sent to remote terminals, the update data set comprising operators describing differences between a first data set comprising sorted data elements and a second data set comprising sorted data elements, the computer system comprising:
    a memory comprising the first and the second data set,
    a comparator connectable to the memory for sequentially comparing the data elements in the second data set with the data elements in the first data set, the result of a first comparison controls which data element in the first data set and which data element in the second data set that will be compared in a second comparison updating a parameter in the memory after each second comparison, and initiating a selector upon detection of a data element in the second data set being identical to a data element in the first data set,
    the selector being connectable to the memory and to the comparator, the selector being adapted to determine operators based on the parameter stored in the memory, and storing the determined operators in the memory,
    wherein the computer system is configured to generate an update data set, including the determined operators describing differences between the second data set and the first data set, to be sent to the remote terminals.

2. A computer system according to claim 1, further comprising a communicator associated with the selector for generating and sending an update message comprising the update data set.

3. A computer system according to claim 1, wherein the first and second data set comprises dynamic data elements changing over time.

4. A computer system according to claim 1, wherein the second data set is a later version of the first data set.

5. A computer system according to claim 1, wherein the operators are determined from a group comprising the following operators:
    Add operator,
    Delete operator,
    Replace operator.

6. A computer system according to claim 1, wherein the change parameter is based on a first counter related to the first data set and a second counter related to the second data set.

7. A computer system according to claim 6, wherein the selector is configured to select operators based on the relation between the first counter related to the first data set and the second counter related to the second data set.

8. A computer system according to claim 1, wherein the change parameter further comprises a first position parameter associated with the first data set and a second position parameter associated with the second data set for keeping track of the position of the comparator in the first and second data set.

9. A computer system according to claim 1, wherein the operators comprises an operator for deleting several elements starting at a given logic position in the first and second data sets.

10. A computer system according to claim 1, wherein each data element comprises a key and a data part.

11. An electronic trading system comprising a computer system according to claim 1.

12. A method for generating an update data set to be sent to remote terminals, the update data set comprising operators describing differences between a first data set comprising sorted data elements stored in a memory and a second data set comprising sorted data elements in the memory, the method comprising the steps of:
- sequentially comparing the data elements in the first data set with the data elements in the second data set, the result of a first comparison controls which data element in the first data set and which data element in the second data set that will be compared in a second comparison,
- after each comparison a change parameter is updated in the memory,
- upon detection of a data element in the second data set being identical to a data element in the first data set, initiating a selection process determining operators based on the change parameter stored in the memory, and
- storing the determined operators in the memory,
- generating an update data set, including the determined operators describing differences between the first data set and the second data set, to be sent to remote terminals.

13. A method according to claim 12, further comprises the step of associating the determined operators to compared data elements.

14. A method according to claim 12, further comprising the step of determining at least one operator from a group comprising the following operators:
Add operator,
Delete operator,
Replace operator.

15. A method according to claim 12, wherein the change parameter is based on a first counter related to the first data set and a second counter related to the second data set, the method further comprising the step of determining operators based on a relation between the first counter related to the first data set and the second counter related to the second data set.

16. A method according to claim 12, wherein each data element comprises a key and a data part, the method further comprising the step of comparing at least one of the key and data part of an element of the first data set with at least one of the key and data part of an element of the second data set.

17. A method according to claim 12, wherein the first and second data set comprises dynamic information that changes over time.

18. A computer program product stored on a non-transitory, computer-readable storage medium and including program instructions, which when executed by a computer, implement the steps of claim 12.

19. A method according to claim 12, wherein the operators comprises an operator for deleting several elements starting at a given logic position.

* * * * *